United States Patent [19]
Yamamoto et al.

[11] Patent Number: 5,692,796
[45] Date of Patent: Dec. 2, 1997

[54] FRONT-END SPOILER ARRANGEMENT FOR AUTOMOTIVE VEHICLE

[75] Inventors: Satoru Yamamoto; Kazuo Yanagimoto; Keisuke Kanie; Tetsuji Ukita; Hitoshi Fukuda, all of Aichi, Japan

[73] Assignee: Mitsubishi Jidosha Kogyo Kabushiki Kaisha, Tokyo, Japan

[21] Appl. No.: 550,814

[22] Filed: Oct. 31, 1995

[30] Foreign Application Priority Data

Oct. 31, 1994 [JP] Japan ................................ 6-267267

[51] Int. Cl.$^6$ .................................................. B62D 35/02
[52] U.S. Cl. ........................................ 296/180.1; 180/903
[58] Field of Search .......................... 296/180.1, 180.2, 296/180.3, 180.4, 180.5, 91; 180/903

[56] References Cited

U.S. PATENT DOCUMENTS 4,810,021  3/1989  Burst ........................ 296/180.1

FOREIGN PATENT DOCUMENTS

| 1336673A | 12/1963 | France . |
|---|---|---|
| 1529933A | 10/1968 | France . |
| 8505038U | 5/1985 | Germany . |
| SHO 54-5460 | 3/1979 | Japan . |
| HEI 1015577 | 5/1985 | Japan . |
| HEI 2303980 | 12/1990 | Japan . |

*Primary Examiner*—David M. Mitchell
*Assistant Examiner*—Kia M. Robinson

[57] ABSTRACT

A front-end spoiler arrangement formed on an under cover of a vehicle has to sufficiently reduce not only front lift acting on front wheels, but also air drag. The front-end spoiler arrangement comprises a front part, a ridge, a step, and a rear part. The step defines a space at the rear part. The front part and the step prevents an increase of the air drag, and air whirls s produced in the space generate downward force.

21 Claims, 9 Drawing Sheets

FRONT-END SPOILER ARRANGEMENT FOR AUTOMOTIVE VEHICLE

BACKGROUND OF THE INVENTION

1. Field of the Invention

This invention relates to a front-end arrangement for an automotive vehicle which is formed on an under cover of the vehicle so as to reduce a lifting force acting on front wheels, and more particularly to a front-end spoiler arrangement suitable to an automotive vehicle having a low height of chassis above ground.

2. Description of the Related Art

Air currents impinging on a front area of a travelling vehicle pushes the vehicle backward, and those present around the vehicle body function to lift it. The faster the vehicle runs, the more air resistance and lift are applied to the automotive vehicle. The air resistance suppresses the driving force of the vehicle while the lift reduces the driving force or braking force of the automotive vehicle.

To overcome the foregoing problems, vehicle bodies are designed and shaped such that both the air resistance and lift can he minimized. A variety of under-floor aerodynamic arrangements have been proposed to reduce the lift applied to the front wheels. FIGS. 18 and 19 of the accompanying drawings exemplify an air dam 1 and an under cover 2, respectively, which are used to reduce the front wheel lift. Referring to FIG. 18, the air dam 1 projects from an under floor of the vehicle and laterally extends thereon (i.e. in a direction perpendicular to the plane shown in FIG. 18). Air currents impinging on the air dam 1 are diverted from the front part of the vehicle, thereby increasing negative lift applied to the vehicle. The under cover 2 shown in FIG. 19 functions to accelerate impinging air currents on its downwardly bulging part, generating a negative pressure under the vehicle and reducing the front wheel lift.

Recently, vehicles have been designed such that they have a reduced coefficient of drag $C_D$, so they can have flat under floors or reduced heights of chassis above ground.

A height of the air dam 1 or the under cover 2 is limited by an approach angle $\alpha$. Therefore, it is difficult to effectively reduce a coefficient of lift ($C_{LF}$). Further, it is difficult for the air dam 1 having a large form drag to reduce the air drag (a reduction of the air drag coefficient $C_D$).

Japanese Utility Model Publication No. Hei 1-015,577 discloses a front-end spoiler which projects in the shape of a letter V from a front under part of a vehicle. Air whirls are generated at a downstream side of the front-end spoiler, thereby preventing an excessive increase in air resistance and reducing front lift (a reduction of the front lift coefficient $C_{LF}$).

In Japanese Patent Laid-Open Publication No. Hei 2-303, 980, a recess is formed on an under floor near the front wheels and at lower ends of front aprons. Air currents flowing into the recess are changed into whirls so as to produce downward force.

The front-end spoiler in Japanese Utility Model Publication No. Hei 1-015,577 is prone to a problem that its height is usually limited by the approach angle $\alpha$. Therefore, the front-end spoiler cannot be high enough to sufficiently reduce the front lift. Further, because of its large form drag, it is difficult for the front-end spoiler to sufficiently reduce the air drag coefficient $C_D$.

In the second prior art, the recess is formed only in an area between the front aprons and spaces before the front wheels. Thus, it is difficult to obtain sufficient downward force.

SUMMARY OF THE INVENTION

The invention is intended to provide a front-end spoiler arrangement which can sufficiently reduce the air drag and front lift.

According to the invention, the front-end spoiler arrangement is formed on an under cover covering a front under part of an automotive vehicle, and comprises: a front part and a rear part extending between a front edge and a rear edge of the under cover, and a step formed between the front and rear parts. The step defines a space on the rear part. In this case, the space functions as a downward recess with respect to the front part.

In this front-end spoiler arrangement, air currents flow on the front part, and are changed into whirls in the space defined by the step. The whirls generate downward force, which reduces lift applied to front wheels. The step is upwardly folded with respect to the front part. Thus, the step is effective in preventing an increase of the air drag.

In the present invention, the step may have a profile of a letter V or U, or a symmetrical polygon. A vertex of the V-shaped or U-shaped, or polygonal step may coincide with a longitudinal center line of a vehicle body.

Further, the step is in the shape of a rectangle whose longitudinal center line coincides with a longitudinal center line of a vehicle body.

With the foregoing step, air currents flowing on the front part reach the step, where they are changed into whirls obliquely advancing toward opposite side portions. The whirls generate the downward force which is effective in reducing the lift applied to the front wheels. The step reliably prevents an increase of the air drag.

In the front-end spoiler, the front part progressively and downwardly bulges toward a rear end of the vehicle. In this case, air currents can flow smoothly on the downwardly bulging front part. The front part and the step can prevent an increase of the air drag. Further, since the bulging front part accelerates the air currents, a negative pressure can be produced under the front part. This causes the downward force which reduces the front lift.

The rear part defining the space thereon with the step may be upwardly inclined toward the rear end of the vehicle. In such a case, whirls generated at the opposite ends of the step near the rear part become larger without any interference as they move toward the rear edge. This is because the rear part is upwardly inclined toward the rear end of the vehicle.

BRIEF DESCRIPTION OF THE DRAWINGS

The present invention will become more apparent from the following detailed description of presently preferred embodiments when taken in conjunction with accompanying drawings, wherein.

DESCRIPTION OF THE PREFERRED EMBODIMENTS

Figure 1:
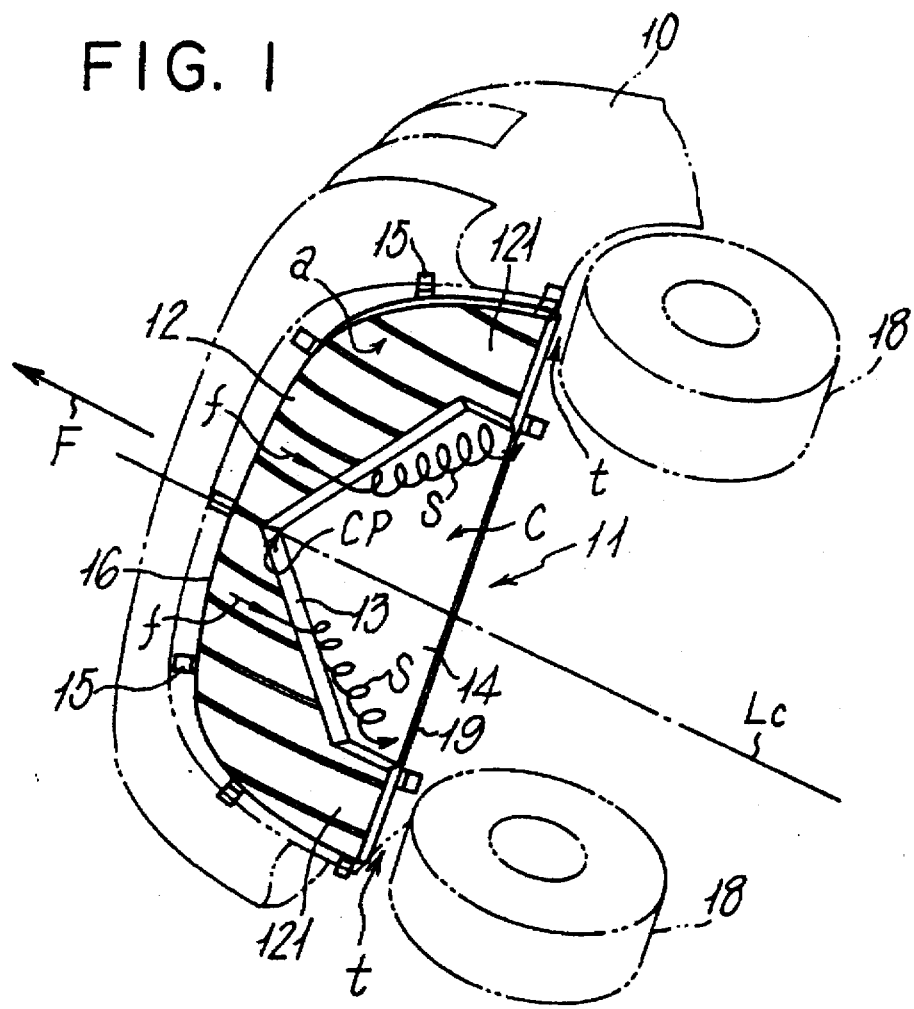
FIG. 1 is a perspective view, viewed in the direction Z shown in FIG. 2, of a front-end spoiler arrangement according to a first embodiment of the invention.

FIG. 1 shows a front-end spoiler arrangement according to a first embodiment of the invention. As shown, the front-end spoiler arrangement (called "front-end spoiler" hereinafter) is formed on an under cover 11, which is made of sheet metal and covers a front underside of an engine compartment of a vehicle 10 (not shown).

The under cover 11 is substantially in the shape of a semicircular plate, and includes a curved front edge 16, a front part 12, a rear part 14, a step 13, a pair of side portions 121, a rear end 19, and a plurality of brackets 15 positioned around a peripheral edge of the under cover 11. The under cover 11 and the front-end spoiler arrangement are formed as a one-piece member.

Figure 3:
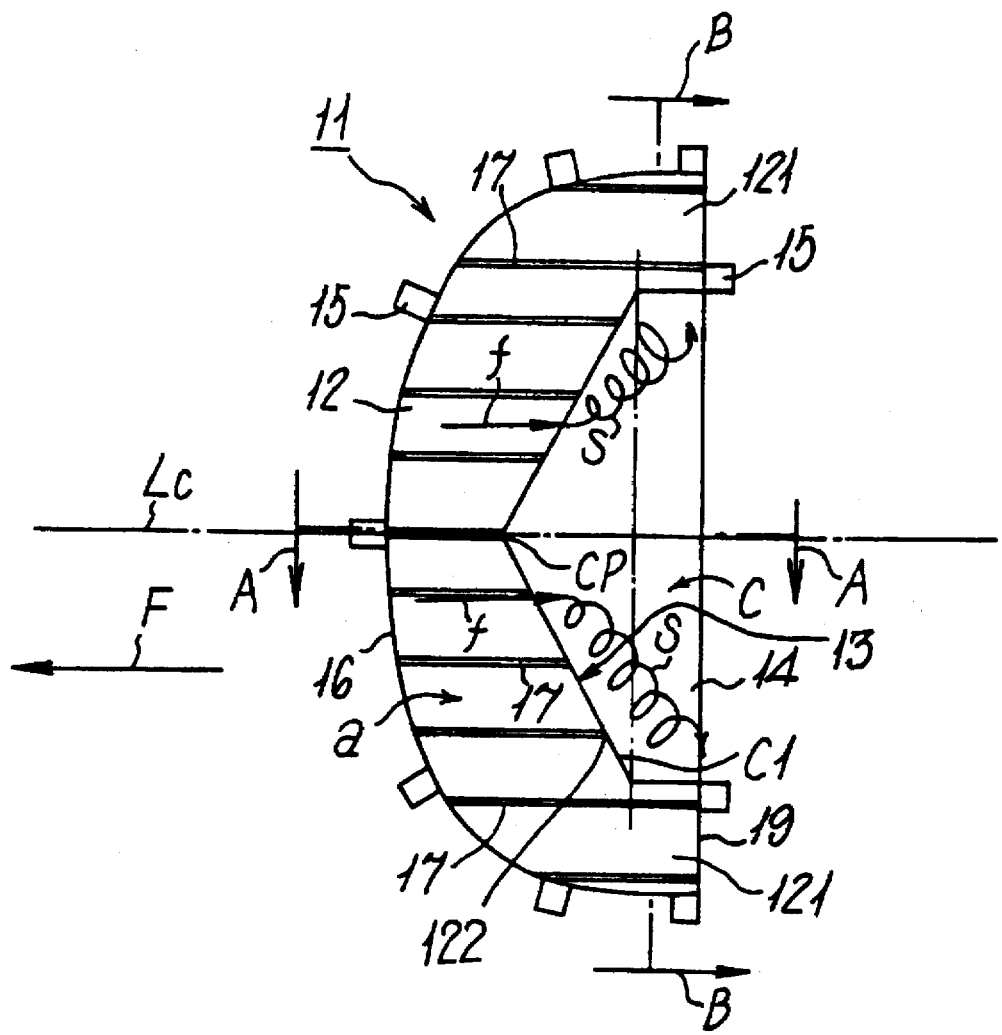
FIG. 3 is a bottom plan view of the front-end spoiler arrangement shown in FIG. 1.

Referring to FIG. 3, the front part 12 extends from the curved front edge 16 toward a rear end of the vehicle, and has a portion a progressively and downwardly bulging toward the rear end (called "bulging portion a). The bulging portion a has a plurality of beads 17 so as to strengthen the front part 12.

The curved front edge 16 joins with the substantially straight rear edge 19.

The side portions 121 extend to the rear edge 19, and are free from the step 13. The side portions 121 face against front wheels 18, as shown in FIG. 1 and function to control air currents f (shown in FIG. 2) such that they are downwardly diverted and are prevented from being caught by the front wheels 18. The more air currents f are caught by the front wheels 18, the more the air drag is increased. In other words, the side portions 121 are effective in preventing an increase of the air drag.

Figure 4:
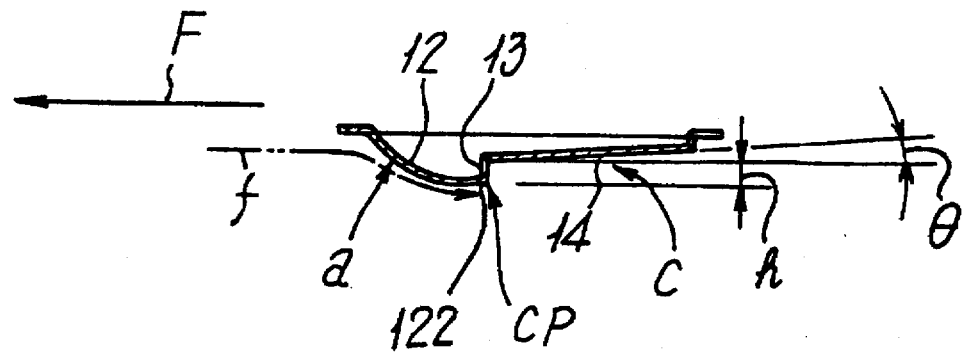
FIG. 4 is a sectional view taken along line A—A of FIG. 3.

As shown in FIGS. 3 and 4, the step 13 is formed by upwardly folding the front part 12. The step 13 has a V-shaped profile. There is a ridge 122 on the front part 12 along the step 13. The step 13 defines a space C at the rear part 14 of the under cover 11, and serves as a downward recess with respect to the front part 12.

Figure 5:
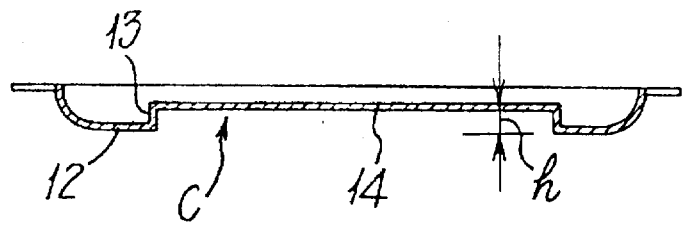
FIG. 5 is a sectional view taken along line B—B of FIG. 3.

As illustrated in FIGS. 4 and 5, the rear part 14 has a height h with respect to the front part 12, and is inclined with an angle θ. Specifically, the rear part 14 is upwardly inclined with respect to the step 13 toward the rear edge 19. A vertex CP of the V-shaped step 13 coincides with a longitudinal center line Lc of the vehicle body (not shown).

The brackets 15 extend from the curved front edge 16 and the rear edge 19, and fasten the under cover 11 to the vehicle body using screws.

While the vehicle is running, the front-end spoiler receives air currents f flowing toward the rear end of the vehicle. The air currents f flow into the space C via the downwardly bulging portion of the front part 12 (FIG. 4).

Referring to FIGS. 1 and 3, when the air currents f from a direction F flow into the space C, which is higher than the front part 12 by the distance h, whirls s are generated by the V-shaped step 13 such that they obliquely advance to the right and left along the edge of the V-shaped step 13 toward the opposite side portions 121. In other words, the whirls s advance toward opposite side edges of the vehicle body, reaching areas inside the front wheels 18. In this state, the whirls s generated at the opposite ends of the step 13 near the rear part 14 become larger without any obstruction as they move toward the rear edge 19. This is because the rear part 14 is upwardly inclined toward the rear end of the vehicle.

The portion a of the front part 12 progressively and downwardly bulges toward the rear end of the vehicle. Thus, the air currents f can smoothly move on the bulging portion a from the curved front edge 16 of the front part 12, so the front part 12 and the step 13 can prevent the increase of the air drag.

Figure 2:
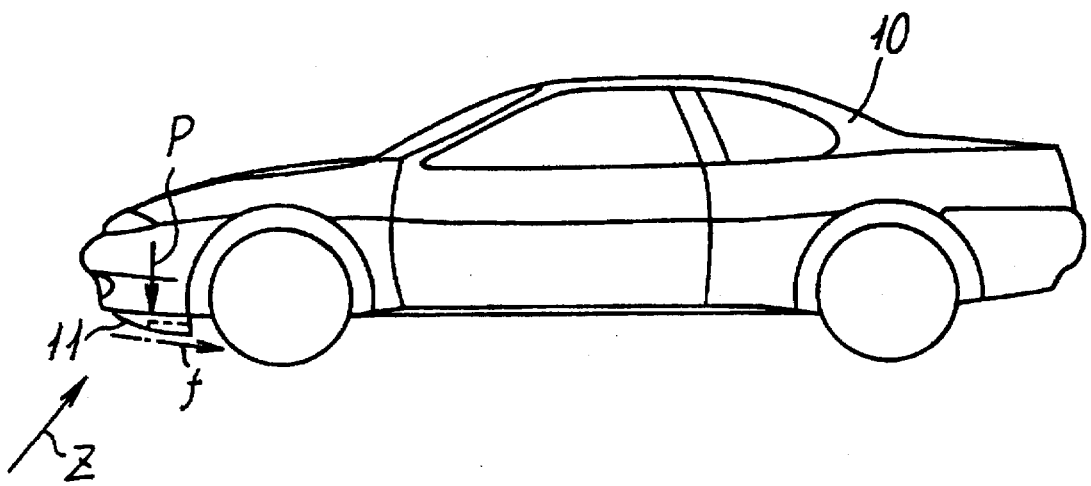
FIG. 2 is a side view of a vehicle to which the front-end spoiler arrangement is applied.

Therefore, a negative pressure produced by the whirls s is locally and strongly applied to the rear part 14 of the under cover 11, functioning as force P to pull the vehicle downward, i.e. downward force P, as shown in FIG. 2. This prevents reduction of driving force or braking force of the vehicle.

Figure 18:
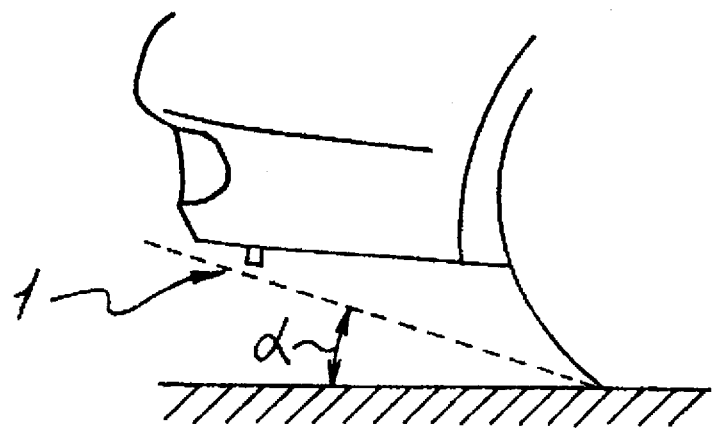
FIG. 18 is a side view of the air dam as a front-end spoiler arrangement of the prior art.

The V-shaped step 13, the vertex of which faces in the forward direction F, directs the whirls s toward the opposite side edges (in a three-dimensional direction) of the vehicle. When compared with the air dam (shown in FIG. 18) facing so as to oppose the forward direction F, the front-end spoiler of the present invention can easily reduce the air drag coefficient $C_D$. Further, the whirls s advance toward the opposite side edges of the vehicle, thereby reaching the areas inside the front wheels 18. Thus, it is possible to guide the whirls having a negative pressure to brake discs (not shown), and to thus cool them more effectively.

Characteristics of the front-end spoiler of the present invention will be described in comparison with the front-end spoilers of the prior art, with reference to FIG. 6.

Figure 6:
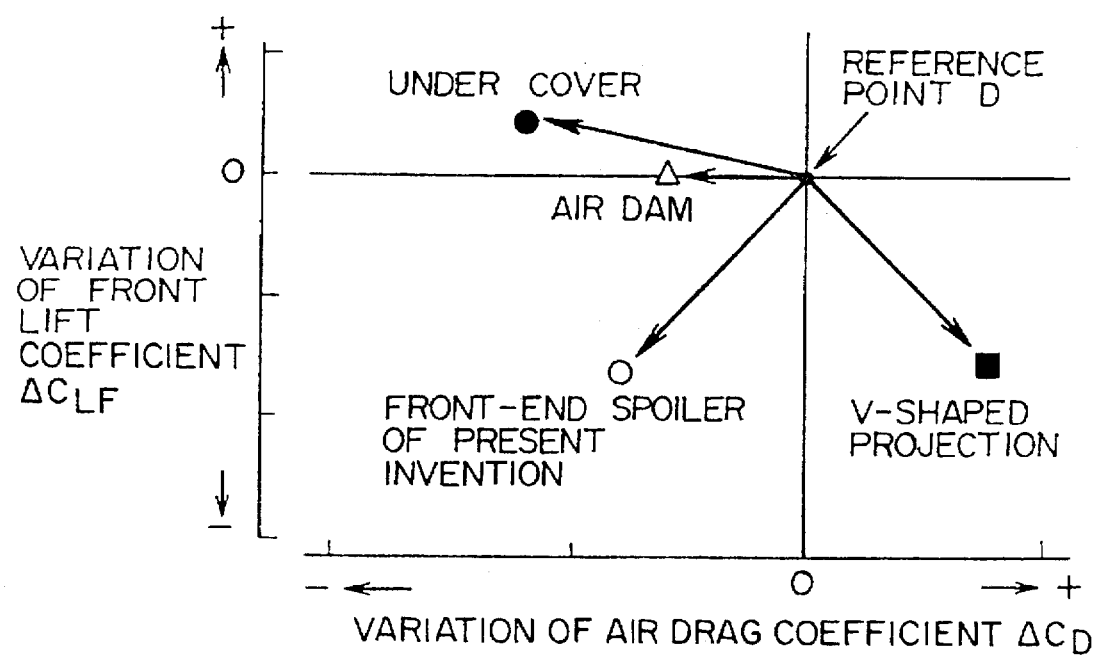
FIG. 6 is a graph showing aerodynamic characteristics of the front-end spoiler arrangement of FIG. 1 and examples of the prior art arrangements.

In FIG. 6, variations of the air drag coefficient $\Delta C_D$ and variations of the front lift coefficient $\Delta C_{LF}$ shown in FIG. 6 were obtained using a test vehicle having the same approach angle α, to which the above-mentioned front-end spoilers were attached.

Figure 19:
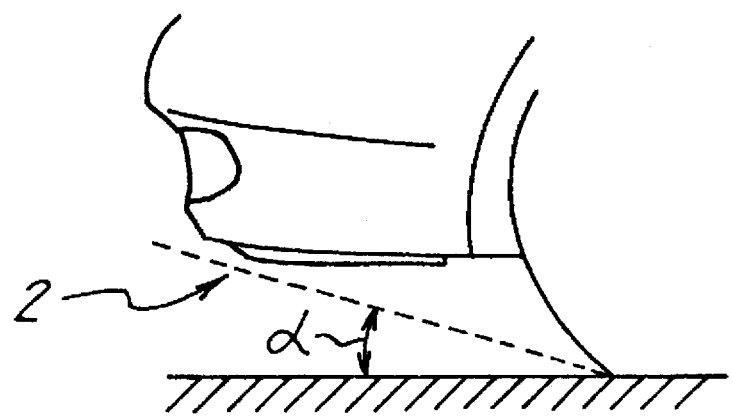
FIG. 19 is a side view of the under cover as a front-end spoiler arrangement of the prior art.

Referring to FIG. 6: D denotes a reference point of characteristics of the test vehicle without a front-end spoiler; a triangle (Δ) denotes characteristics of the air dam of the prior art shown in FIG. 18; a black circle (●) denotes characteristics of the under cover of the prior art shown in FIG. 19; a black square (■) denotes characteristics of the V-shaped projection as the front-end spoiler disclosed in Japanese Utility Model Publication No. Hei 1-015,577 (the data confirmed by the inventors); and a circle (○) denotes characteristics of the front-end spoiler according to the present invention.

As can be seen from FIG. 6, the air dam (△) and the under cover (●) did not reduce the variations of the front lift coefficient $\Delta C_{LF}$ and air drag coefficient $\Delta C_D$. The V-shaped projection (■) reduced the variation of the front lift coefficient $\Delta C_{LF}$, but positively increased the variation of the air drag coefficient $\Delta C_D$. In comparison with those prior art devices, the front-end spoiler (○) of the present invention prevented positive increases in the variation of the front lift coefficient $\Delta C_{LF}$ and reduced the variation of the air drag coefficient $\Delta C_D$. This means that the front-end spoiler of the present invention can generate the downward force P for reducing the front lift and, effectively prevent the reduction of driving force and braking force of the vehicle.

In the first embodiment, the under cover 11 is made of sheet metal. Alteratively, an under cover 20 made of resin may be used as shown in FIGS. 7 to 9 related to a second embodiment of the invention.

Figure 7:
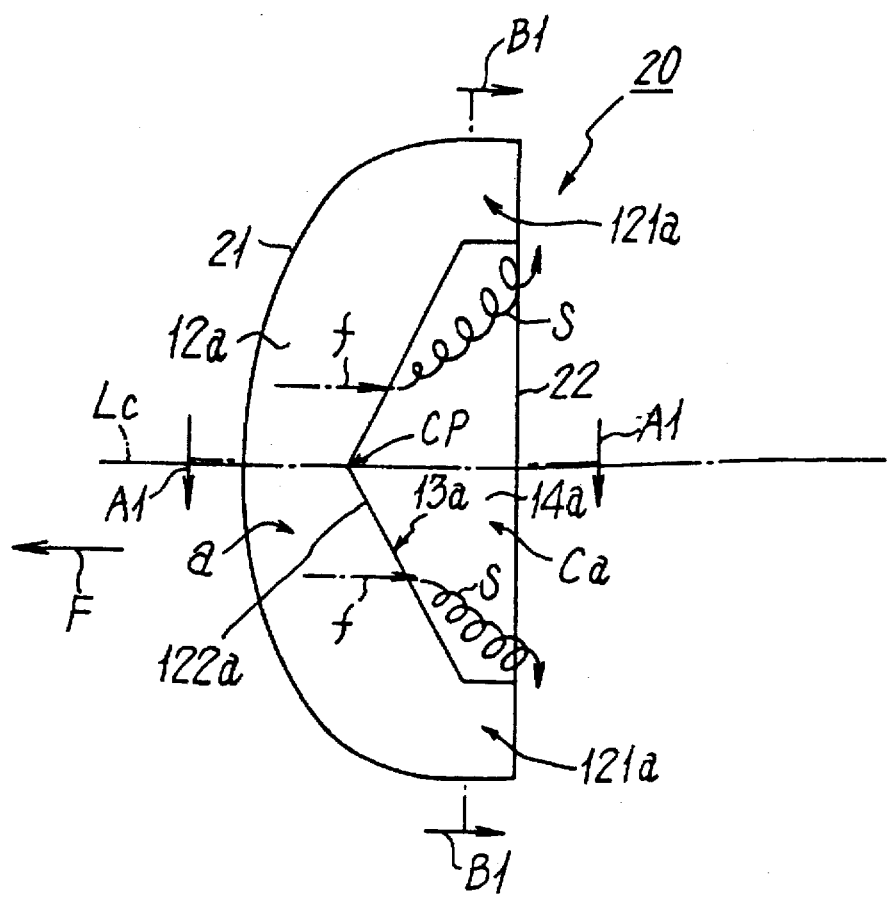
FIG. 7 is a bottom plan view of a front-end spoiler arrangement according to a second embodiment of the invention.
Figure 8:
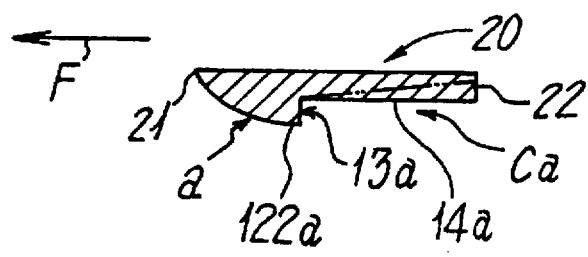
FIG. 8 is a sectional view taken along line A1—A1 of FIG. 7.
Figure 9:
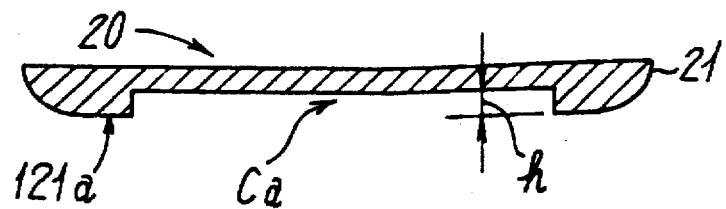
FIG. 9 is a sectional view taken along line B1—B1 of FIG. 7.

As illustrated in FIGS. 7–9, the under cover 20 is substantially in the shape of a thick semicircular plate, and has a curved front edge 16, a front part 12a, a ridge 122a, a step 13a, a pair of side portions 121a, and a rear part 14a. The step 13a defines a space Ca at the rear part 14a. The space Ca is similar to the space C in the first embodiment, and is higher than the front part 12a by a height h. The foregoing components are formed as a one-piece member. The side portions 121a facing against the front wheels 18 guide air currents f downward, and prevent them from being caught by the front wheels 18 and prevent the increase of the air resistance. The under cover 20 is screwed on the vehicle body using brackets (not shown) along the curved front edge 16 and the rear edge 22.

In operation, the front-end spoiler of the second embodiment changes air currents f into whirls s at the V-shaped step 13a. The whirls s are diverted toward areas inside the front wheels 18. Thus, a negative pressure is caused by the whirls s at the rear part 14a, which applies the downward force P to the front wheels 18 so as to reduce the front lift and prevent the reduction of the driving or braking force. Since the front part 12a progressively and downwardly bulges toward the rear end of the vehicle body, the front part 12a and the step 13a can prevent an increase of the air drag. Further, the whirls s generated by the step 13a reach the areas inside the front wheels 18, so a negative pressure can be guided to disc brakes (not shown), which is effective in cooling the disc brakes. In addition, the under cover 20 made of resin is light in weight.

Figure 10:
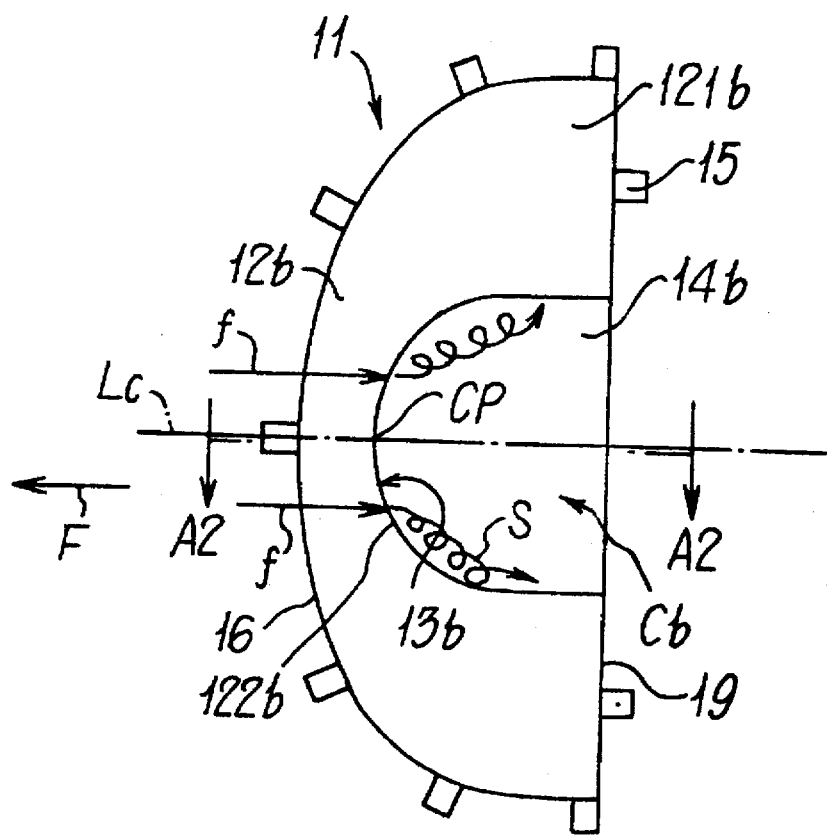
FIG. 10 is a bottom plan view of a front-end spoiler arrangement according to a third embodiment.

FIG. 10 shows a front-end spoiler according to a third embodiment of the invention. This embodiment features a space Cb whose shape differs from the space C of the first embodiment. Therefore, identical parts have identical reference numbers, and will not be repeatedly described in detail.

Figure 11:
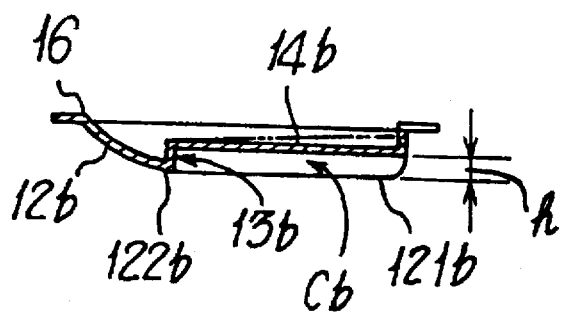
FIG. 11 is a sectional view taken along line A2—A2 of FIG. 10.

Referring to FIGS. 10 and 11, the front-end spoiler is formed on the under cover 11 made of sheet metal, and includes a curved front edge 16, a front part 12b, a ridge 122b, a step 13b, side portions 121b, a rear part 14b, and a rear edge 19. The step 13b defines the space Cb at the rear part 14b. The side portions 121b are free from the step 13b, and extend to the rear edge 19.

The step 13b has a profile in the shape of a letter U, of which vertex CP coincides with the longitudinal center line Lc of the vehicle body.

When air currents f impinge onto the foregoing front-end spoiler, the U-shaped step 13b diverts them as whirls s obliquely advancing right and left toward the opposite sides edges of the vehicle.

Thus, the whirls s generate a negative pressure on the rear part 14b, which generates the downward force P for reducing the front lift, and prevents the reduction of the driving or braking force of the vehicle. In this embodiment, the front part 12b progressively and downwardly bulges such that it can prevent an increase of the air drag together with the step 13b. The step 13b is also effective in assuring a reduced air drag coefficient $C_D$.

A front-end spoiler according to a fourth embodiment will be described with reference to FIGS. 12 and 13. This embodiment differs from the first embodiment in the shape of a space Cc.

Figure 12:
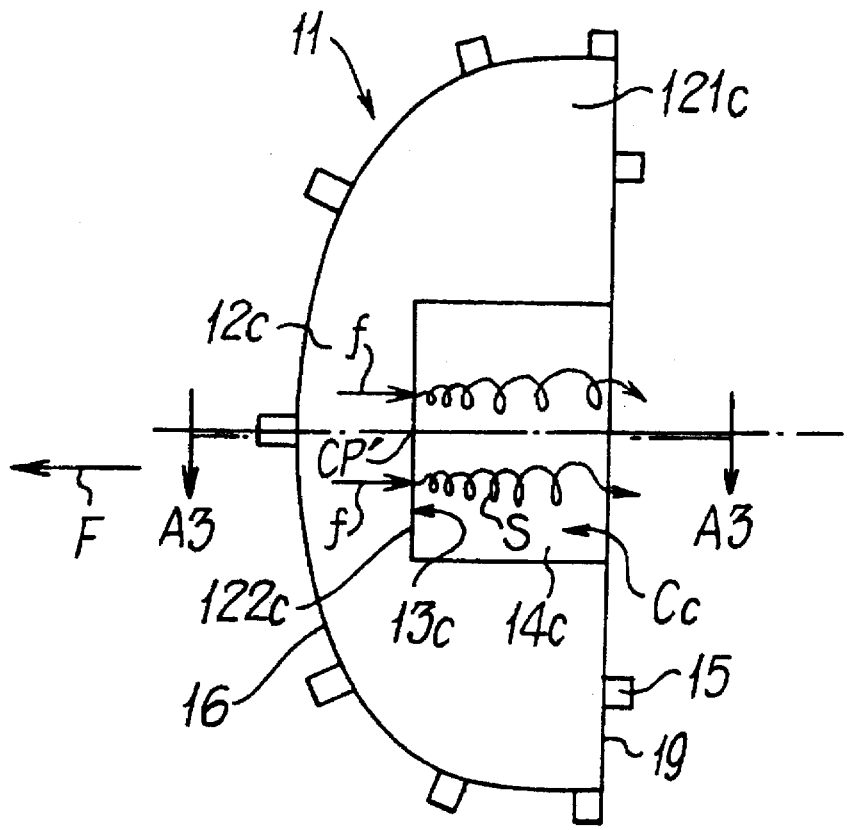
FIG. 12 is a bottom plan view of a front-end spoiler arrangement according to a fourth embodiment.
Figure 13:
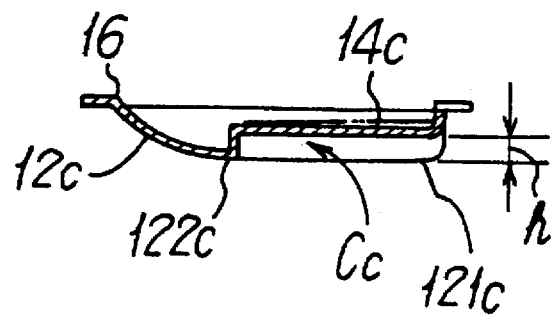
FIG. 13 is a sectional view taken along line A3—A3 of FIG. 12.

Referring to FIGS. 12 and 13, the front-end spoiler is formed on the under cover 11 made of a sheet metal, and includes a curved front edge 16, a front part 12c, a step 13c, a ridge 122c, a rear part 14c, a pair of side portions 121c, and a rear edge 19. The side portions 121c are free from the step 13c, and extend to the rear edge 19.

The step 13c and the rear edge 19 define the space Cc in the shape of a rectangle. A longitudinal center CP' of the rectangular space Cc coincides with the longitudinal center line Lc of the vehicle body.

Air currents f striking the front-end spoiler are changed into whirls s by a linear portion of the step 13c, and these whirls flow toward the rear end of the vehicle.

The whirls s cause a negative pressure on the rear part 14b of the under cover 11, which serves as a downward force P to reduce the front lift, and prevents reduction of the driving or braking force. The front part 12c progressively and downwardly bulges toward the rear end of the vehicle, so it can prevent an increase of the air drag together with the step 13c. Thus, it is possible to reduce the air drag coefficient $C_D$.

Figure 14:
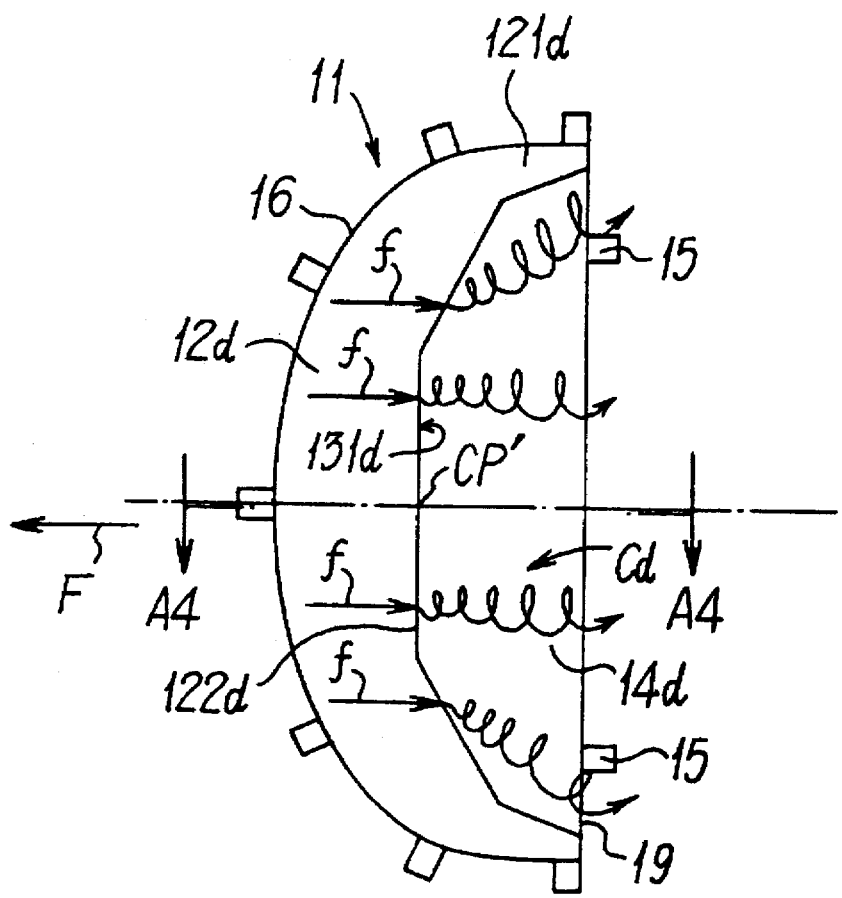
FIG. 14 is a bottom plan view of a front-end spoiler arrangement according to a fifth embodiment.

FIG. 14 shows a front-end spoiler according to a fifth embodiment. This embodiment differs from the first embodiment of FIG. 1 in the shape of a space Cd, which will be described in detail. The other components are substantially the same as those in the first embodiment, and will not be repeatedly described here.

Figure 15:
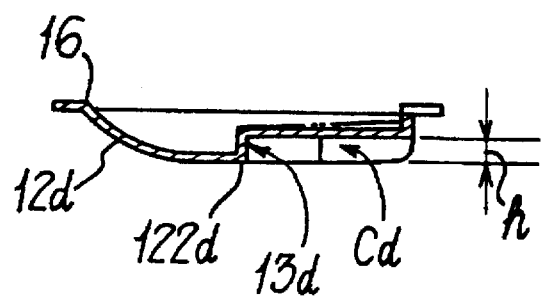
FIG. 15 is a sectional view taken along line A4—A4 of FIG. 14.

Referring to FIGS. 14 and 15, the front-end spoiler is formed on the under cover 11, and includes a curved front edge 16, a front part 12d, a ridge 122d, a step 13d, a pair of side portions 121d, a rear part 14d, and a rear edge 19. The step 13d defines a polygonal space Cd at the rear part 14d. The space Cd is higher than the front part 12d by a height h. The side portions 121d are free from the step 13d, and extends to the rear edge 19.

The step 13d has a polygonal profile. A center line CP halving a straight portion 131d of the polygonal step 13d coincides with the longitudinal center line Lc of the vehicle body.

When air currents f impinges onto the foregoing front-end spoiler, the polygonal step 13b diverts them as whirls s obliquely advancing toward the opposite side edges of the vehicle.

Thus, the whirls s generate a negative pressure in the space Cd on the rear part 14d, which in turn generates the downward force P for reducing the front lift P, which prevents the reduction of the driving or braking force of the vehicle. In this embodiment, the front part 12d progressively and downwardly bulges such that it can prevent an increase of the air drag together with the step 13d. The step 13d is also effective in assuring the reduction of the air drag coefficient $C_D$.

Figure 16:
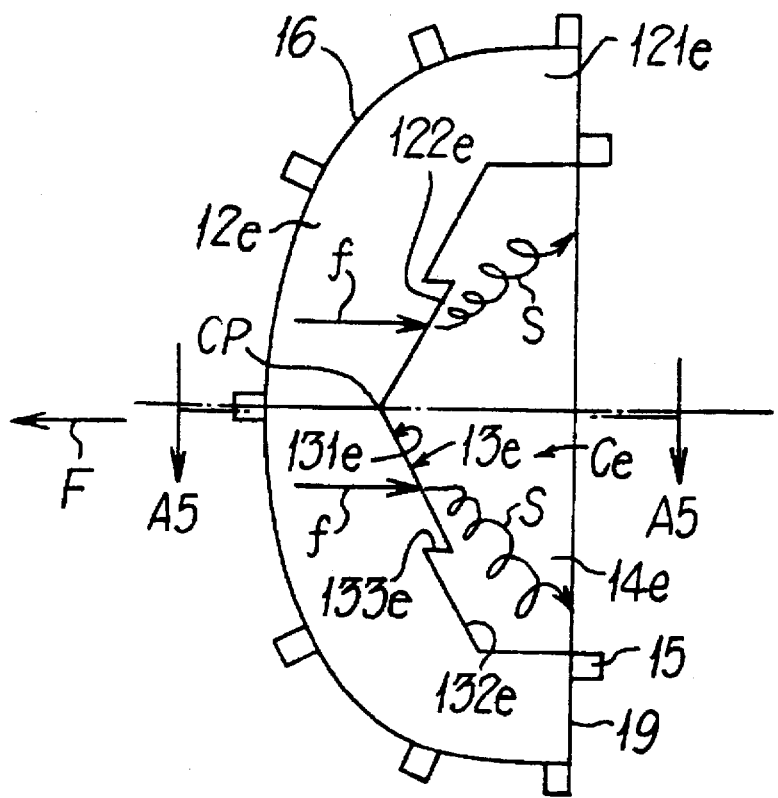
FIG. 16 is a bottom plan view of a front-end spoiler arrangement according to a sixth embodiment.

FIG. 16 shows a front-end spoiler according to a sixth embodiment. This embodiment differs from the first embodiment of FIG. 1 in the shape of a space Ce, which will be described in detail. The other components are substantially the same as those in the first embodiment, and will not be repeatedly described here.

Figure 17:
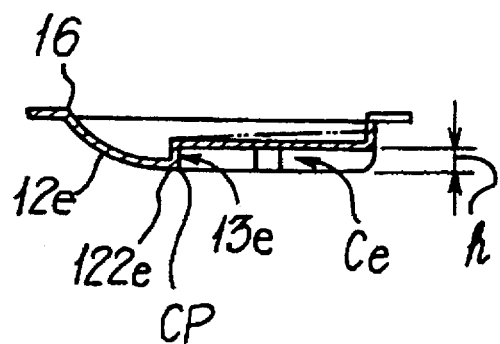
FIG. 17 is a sectional view taken along line A5—A5 of FIG. 16.

Referring to FIGS. 16 and 17, the front-end spoiler is formed on the under cover 11, and includes a curved front edge 16, a front part 12e, a ridge 122e, a step 133e, a pair of side portions 121e, a rear part 14e, and rear edge 19. The step 13e defines a modified polygonal space Cd at the rear part 14e. The space Ce is higher than the front part 12e by a height h. The side portions 121e are free from the step 13e, and extend to the rear edge 19.

The step 13d has a modified polygonal profile having a center V-shaped portion 131e and a pair of sawtoothed projections having portions 132e and 133e. A Vertex CP of the V-shaped portion 131e of the modified polygonal step 13e coincides with the longitudinal center line Lc of the vehicle body.

When air currents f impinge onto the foregoing front-end spoiler, the polygonal step 13e diverts them as whirls s obliquely advancing right and left toward the opposite sides of the vehicle.

Thus, the whirls s generate a negative pressure in the space Ce at the rear part 14e, thus producing the downward force P for reducing the front lift, and preventing the reduction of the driving or braking force of the vehicle. In this embodiment, the front part 12e progressively and downwardly bulges such that it can prevent an increase of the air drag together with the step 13e. The step 13e is also effective in assuring the reduction of the air drag coefficient $C_D$.

In the front-end spoilers formed on the under covers 11 in the second to sixth embodiments, the rear parts 14a to 14e have the spaces Ca to Ce which are higher than the front parts 12a to 12e by the height h. In these embodiments, the rear ends 14a to 14e may be upwardly inclined toward the rear end of the vehicle as shown by dashed lines in FIGS. 8, 11, 13, 15 and 17. In such a case, the whirls s generated near the rear parts 14a to 14e can become larger without obstruction, and cause downward force P, which reliably reduce the lift to be applied to the front wheels.

The front-end spoiler arrangements of the present invention are applicable to automotive vehicles having a reduced height of chassis above ground which is affected by the approach angle α. These front-end spoiler are effective in improving acceleration and braking force.

What is claimed is:

1. An under cover having a front-end spoiler and covering a front under part of an automotive vehicle, said under cover comprising:
   a first face extending over the front under part;
   a second face extending over the front under part, said second face being offset from said first face in an upper direction with respect to said first face; and
   a step creating said offset steeply rising from said first face to said second face, said step and said second face defining a space,
   wherein said step forms whirls of air in said space such that the whirls of air generate a down force that urges the vehicle toward a road surface.

2. An under cover of claim 1, wherein said step has a profile of a letter V, and a vertex of the V-shaped step is positioned close to a front end of the vehicle and coincides with a longitudinal center line of a vehicle body, and said step opens toward a rear end of the vehicle.

3. An under cover of claim 1, wherein the step has a profile of a letter U, and a vertex of the U-shaped step is positioned close to a front end of the vehicle and coincides with a longitudinal center line of a vehicle body, and said step opens toward a rear end of the vehicle.

4. An under cover of claim 1, wherein the step has a front portion which is orthogonal to a longitudinal center line of a vehicle and extends toward opposite side edges of the vehicle body.

5. An under cover of claim 1, wherein the step is symmetrical in shape with respect to a longitudinal axis of the vehicle.

6. An under cover of claim 1, wherein said first face progressively and downwardly bulges in a curved state toward a rear end of the vehicle.

7. An under cover of claim 1, wherein said second face is upwardly sloped toward a rear end of the vehicle.

8. An under cover of claim 2, wherein said first face progressively and downwardly bulges in a curved state toward a rear end of the vehicle.

9. An under cover of claim 3, wherein said first face progressively and downwardly bulges in a curved state toward a rear end of the vehicle.

10. An under cover of claim 4, wherein said first face progressively and downwardly bulges in a curved state toward a rear end of the vehicle.

11. An under cover of claim 5, wherein said first face progressively and downwardly bulges in a curved state toward a rear end of the vehicle.

12. An under cover of claim 2, wherein said second face is upwardly sloped toward a rear end of the vehicle.

13. An under cover of claim 3, wherein said second face is upwardly sloped toward a rear end of the vehicle.

14. An under cover of claim 4, wherein said second face is upwardly sloped toward a rear end of the vehicle.

15. An under cover of claim 5, wherein said second face is upwardly sloped toward a rear end of the vehicle.

16. An under cover of claim 6, wherein said second face is upwardly sloped toward the rear end of the vehicle.

17. An under cover for covering an under section of a vehicle, comprising:
   a first section extending substantially over an entire width of the under section and covering at least front and side peripheral portions of the under section, said first section directly facing a road surface; and
   a second section covering at least a center portion of the under section surrounded by said at least front and side peripheral portions of said first section, said second section directly facing the road surface and forming a recessed portion in conjunction with said first section, such that whirls of air formed in said recessed portion generate a down force that urges said vehicle toward the road surface.

18. An under cover of claim 17, further comprising:
   a step connecting said at least front and side peripheral portions of said first section to said second section.

19. An under cover of claim 17, wherein said second section covers the under section including a longitudinal center line of the vehicle.

20. An under cover of claim 17, wherein said second section is inclined with respect to the first section such that said recess becomes deeper as said second section reaches a rear peripheral portion thereof.

21. An under cover of claim 19, wherein said step guides the whirls of air to a brake system of the vehicle.

* * * * *